United States Patent [19]

Linde

[11] Patent Number: 4,528,002
[45] Date of Patent: Jul. 9, 1985

[54] PROCESS FOR SEPARATION OF $CO_2$ FROM $CO_2$-CONTAINING GASES

[75] Inventor: Gerhard Linde, Gruenwald, Fed. Rep. of Germany

[73] Assignee: Linde Aktiengesellschaft, Wiesbaden, Fed. Rep. of Germany

[21] Appl. No.: 602,884

[22] Filed: Apr. 23, 1984

[30] Foreign Application Priority Data

Apr. 21, 1983 [DE] Fed. Rep. of Germany ....... 3314381

[51] Int. Cl.³ ............................................. B01D 53/14
[52] U.S. Cl. .......................................... 55/48; 55/68; 55/73; 62/17
[58] Field of Search ................... 55/40, 43, 46, 48, 51, 55/68, 73; 62/17, 27, 23, 24

[56] References Cited

U.S. PATENT DOCUMENTS

| | | | |
|---|---|---|---|
| 3,001,373 | 9/1961 | Eastman et al. | 62/17 |
| 3,553,936 | 1/1971 | Little et al. | 55/40 |
| 3,910,777 | 10/1975 | Jakob | 55/48 |
| 4,294,590 | 10/1981 | Linde et al. | 55/48 |
| 4,305,733 | 12/1981 | Scholz et al. | 62/17 X |
| 4,330,511 | 5/1982 | Nelson et al. | 55/68 X |

Primary Examiner—Charles Hart
Attorney, Agent, or Firm—Millen & White

[57] ABSTRACT

For separating $CO_2$ from $CO_2$-containing gases, especially stack gases and/or blast furnace gases, dimethylformamide is employed as a physical scrubbing medium to ensure high $CO_2$ purity. After absorption of $CO_2$, the DMF is regenerated and returned into the scrubbing stage. Dimethylformamide is utilized as the scrubbing medium.

13 Claims, 1 Drawing Figure

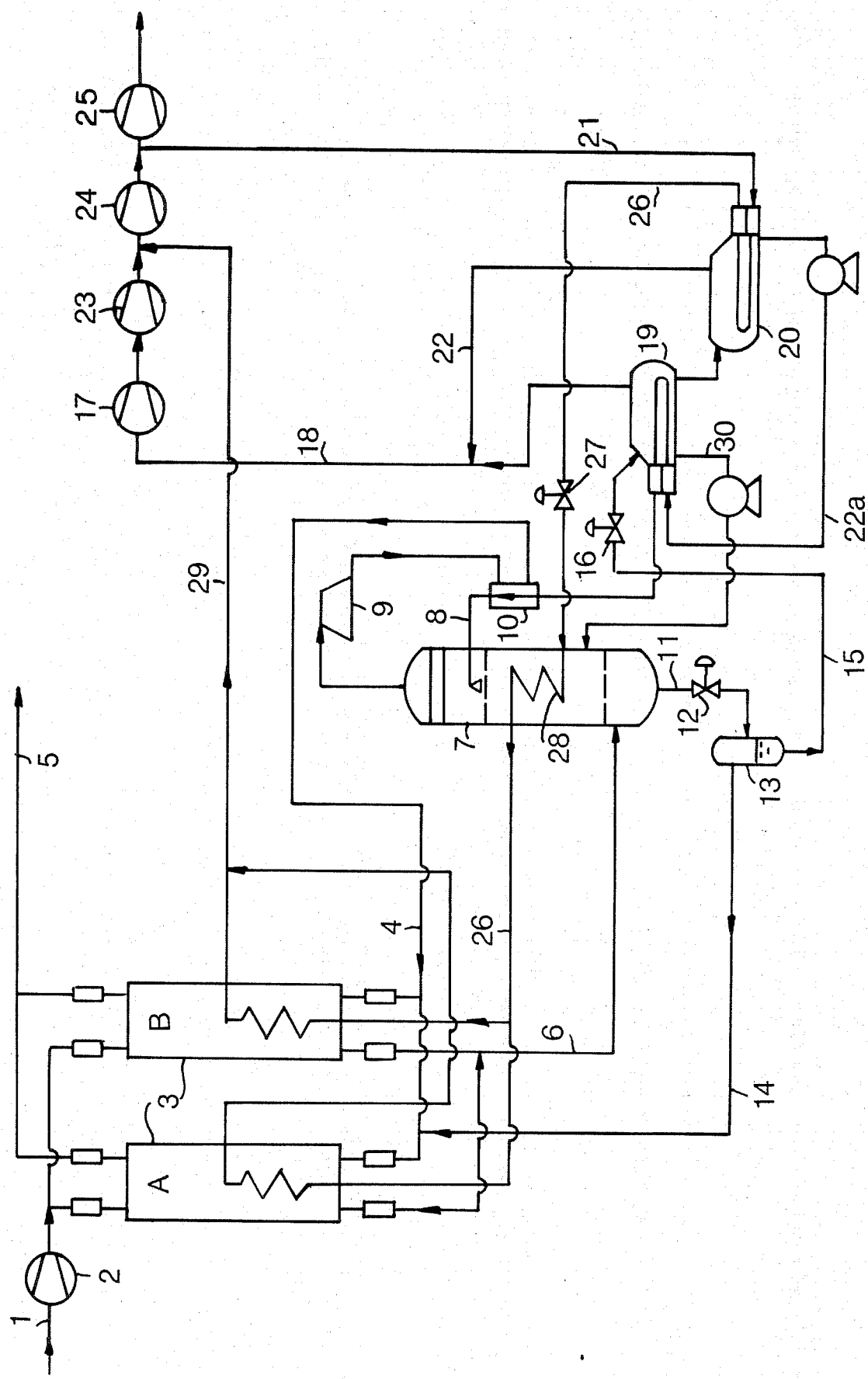

PROCESS FOR SEPARATION OF CO₂ FROM CO₂-CONTAINING GASES

BACKGROUND OF THE INVENTION

This invention relates to a process for the separation of $CO_2$ from $CO_2$-containing gases, especially stack or flue gases and/or blast furnace gases, by scrubbing with a physical scrubbing medium which is thereafter regenerated to remove $CO_2$, and is then recycled into the scrubbing stage.

Several methods are known for obtaining $CO_2$ from gaseous mixtures. Chemical and physical scrubbing operations, as well as adsorptive separating methods have distinguished themselves as the important processes. Important chemical scrubbing operations include, for example, the $NH_3$ or monoethanolamine (MEA) scrubbing processes, whereas the methanol scrubbing process conducted at low temperatures is important as a physical scrubbing operation. Adsorptive removal of $CO_2$ from gaseous mixtures can be effected with the aid of activated carbon or a molecular sieve. Another possibility for separating $CO_2$ from gaseous mixtures is the regenerator method employing the periodic application of a vacuum to purge the regenerator of $CO_2$.

Though the technology of removing $CO_2$ from industrial gases is indeed very old, all the conventional processes exhibit one or more disadvantages. For example, the chemical scrubbing methods require for regeneration a very high thermal input, in the form of low-pressure steam ($\geq 2.5$ bar), for example, and such methods initially yield a water-saturated gas which, due to danger of corrosion, must be dried before being further compressed (generally to 140 bar). Physical scrubbing with methanol, as the absorbent, due to the high vapor pressure of methanol may result in very high losses of scrubbing medium. In this process, the stack gas, at ambient pressure, would either have to be compressed to high pressures, or the process would have to be conducted under extremely low temperatures to maintain losses of methanol within economical limits. However, both measures entail excessive costs in energy. Finally, the regenerator process yields a gas having too high a proportion of $N_2$ which would have to be subsequently separated at high expense in order to obtain sufficiently pure $CO_2$.

SUMMARY

It is therefore an object of the present invention to provide an improved process of the type discussed hereinabove, especially a process wherein deficiencies of the prior art are diminished or eliminated. A further object is to provide a $CO_2$ product of high purity.

Upon further study of the specification and appended claims, further objects and advantages of this invention will become apparent to those skilled in the art.

These objects are attained according to the invention by utilizing dimethylformamide as the scrubbing medium.

Dimethylformamide (DMF) has proven to be suitable for the separation of $CO_2$ from gases containing at least about 8, preferably at least about 8 to 30 $CO_2$ in percent by volume, especially from stack gases and/or blast furnace gases. The vapor pressure of DMF is lower by two powers of ten than that of methanol, but it has practically the same high solubility for $CO_2$ as methanol. In this connection, the use of DMF as the scrubbing medium offers the substantial advantage of lowering the losses and costs for the operating medium while simultaneously maintaining a level of initial investment costs which, at least, are no higher than when using methanol. Moreover, since the $CO_2$ is obtained as an anhydrous gas, there is no need for drying the thus-separated $CO_2$ as is the case, for example, in chemical scrubbing operations. Another advantage in using DMF resides in that gases having any level of sulfur content ($SO_2$) can be processed without the occurrence of any problems in the scrubbing process or any contamination of the $CO_2$ product. The reason for this is that DMF possesses an extremely high solubility for $SO_2$ with simultaneously a very high selectivity. Any $SO_2$ contained in the gas can be transferred out by regeneration of a minimum partial stream of DMF. This partial stream, containing about 1% $SO_2$ by weight will handled in a small additional column, heated with steam under low pressure. The soluted $SO_2$ will be taken out on the top of this column as a $SO_2$-rich gasstream. This $SO_2$ stream can be used for chemicals ($H_2SO_4$, elemental sulfur) or can be liquified for transportation.

The scrubbing process with the use of DMF is carried out according to a preferred embodiment under a pressure of 1.5–3 bar and at a temperature of $-30°$ to $-60°$ C. Thus, the stack gas which, in most cases, is not present under pressure, need only be compressed to a moderately high pressure.

According to a preferred embodiment of the invention, regeneration of the scrubbing medium is conducted by pressure reducing and heating the scrubbing medium. In this process, the regeneration is advantageously conducted under vacuum, specifically under a pressure of 0.05–0.3 bar, and at a temperature of between $-60°$ and $-10°$ C. By operating under such conditions, it is possible to obtain a product purity of $CO_2$ of up to 99% by volume.

The $CO_2$ liberated during regeneration is then compressed in a plurality of compression steps, e.g., 2, preferably 4 steps, suitably to, in total, about 80 to 200, especially about 140 bar. According to another preferred embodiment of the process of this invention, the loaded scrubbing medium is heated in heat exchange with a partial stream of the product $CO_2$, the latter being at a medium pressure, e.g., about 6 to 20, especially about 6 to 15 bar, so that the medium-pressure $CO_2$ is liquefied during this step. After expansion by pressure reduction, the liquefied $CO_2$ is vaporized and discharged. In a preferred aspect of the invention, the $CO_2$ can be vaporized in a cooling coil arranged in the scrubbing column, whereby the heat of solution released during absorption of $CO_2$ in the scrubbing medium is removed. The removal of the $CO_2$ product by the use of a vacuum, and the medium-pressure auxiliary $CO_2$ cycle is preferably integrated into the necessary $CO_2$ compression system.

According to another preferred embodiment of this invention, the $CO_2$-containing gas is cooled by means of reversible regenerators prior to the scrubbing step. The regenerators are filled with acid-resistant heat-storage regenerator packing material of a conventional kind.

The pure $CO_2$ obtained by the process of this invention can be utilized especially for injection into petroleum reservoirs. In general, the process of this invention provides $CO_2$ gas of at least 99.5, and preferably at least 98% by volume.

BRIEF DESCRIPTION OF DRAWING

The attached drawing is a FIGURE depicting a preferred embodiment of the invention in schematic form.

DETAILED DESCRIPTION

Stack gas under ambient pressure containing about 13.5 vol-% of $CO_2$ is introduced via conduit 1 and compressed to 2.4 bar in a compressor 2. The stack gas is available at a temperature of 130°–150° C. In a regenerator system 3, the stack gas is cooled conventionally to $-50°$ C. The regenerator system 3 consists, in the present example, of two mutually separated, reversible and interchangeably connected regenerators. While, for example, in regenerator (A) stack gas is cooled off on the regenerator packing in a flow direction from the top toward the bottom, the stack gas freed of $CO_2$ is reheated via a conduit 4 while flowing through regenerator (B) in a direction from the bottom (the temperature level of the scrubbing process) toward the top to a temperature of about 120° C. and is discharged via a conduit 5. The flow through the regenerators is cyclically reversed after a switching time of, for example, three minutes.

The stack gas, cooled to $-50°$ C., is fed via a conduit 6 to the lower section of a scrubbing column 7 and freed of $CO_2$ by physical absorption. The scrubbing medium employed is dimethylformamide in accordance with this invention. This scrubbing medium is introduced via conduit 8 into the upper section of the scrubbing column 7. The stack gas is thus freed of $CO_2$ countercurrently to downwardly flowing DMF and can be withdrawn from the head of the scrubbing column 7, expanded in turbine 9, heated in heat exchanger 10, with regenerated scrubbing medium to be cooled, and fed via conduit 4 to the regenerator system 3. The ratio of solvent to $CO_2$ is about 30 to 50 tons solvent to one ton of $CO_2$. The number of theoretical plates in the scrubber is between 8 to 20.

The loaded scrubbing medium is withdrawn from the sump of scrubbing column 7 via conduit 11 and expanded in valve 12 to about atmospheric pressure. During this step, any concomitantly dissolved $N_2$ is removed in the gaseous phase; this $N_2$ is withdrawn from a separator 13 via conduit 14 and fed, together with the regenerated stack gas, in conduit 4 to the regenerator system 3.

The remaining scrubbing medium is withdrawn via conduit 15 from separator 13 and expanded via valve 16. During expansion, $CO_2$ is liberated, present under a pressure of 0.1 bar and removed by means of a fan 17 in conduit 18 from a separator 19. The partially regenerated scrubbing medium is conducted to a further separator 20 and heated therein in heat exchange with a partial stream of the product $CO_2$ from conduit 21 to $-20°$ C. During this step, additional $CO_2$ is driven off in the gaseous phase and is admixed via conduit 22 to the $CO_2$ product from the first separator. The heated and completely regenerated DMF is withdrawn via conduit 22a and cooled in separator 19 in heat exchange with DMF to be regenerated, and again introduced into the scrubbing column 7 by way of conduit 8.

The product $CO_2$ in conduit 18 is compressed in compressor 23 to about 5.7 bar, in compressor 24 to 20 bar and in compressor 25 to 140 bar and discharged.

The partial stream of product $CO_2$ branched off via conduit 21 is thus under a medium pressure of 20 bar at a temperature of about 30° C. This medium-pressure $CO_2$ is liquefied in heat exchange with regenerated DMF, withdrawn via conduit 26 and, after expansion, via valve 27, to 6 bar, vaporized in a cooling coil 28 arranged in the scrubbing column 7. In this way, the heat of solution liberated during $CO_2$ absorption in the DMF is removed. Finally, the resultant preheated partial stream of $CO_2$ is conducted through the regenerator system 3 for further heating, and fed, at a temperature of 20° C. and under a pressure of 5.7 bar via conduit 29 to the $CO_2$ product upstream of the compressor 24.

If the stack gas contains also $SO_2$ besides $CO_2$, this $SO_2$ is likewise dissolved in the DMF. Therefore, the provision is made to withdraw a partial stream of the partially regenerated DMF via conduit 30 and transfer $SO_2$ out of this stream.

A comparison of the costs for operating media when using a chemical scrubbing operation—an $NH_3$ scrubbing process has been selected as the example—and when using the DMF scrubbing operation of this invention is set forth below. In both cases, a raw gas containing 13.5 vol-% of $CO_2$ is the starting material. The product obtained is 10,000 $Nm^3/h$ of pure $CO_2$ (99 vol-%) under a pressure of 140 bar.

|  | $NH_3$ Scrubbing | DMF Scrubbing |
|---|---|---|
| Electrical Energy |  |  |
| MW @ DM 80 | 4.0 MW = | 7.7 MW = |
|  | DM 320 per hour | DM 616 per hour |
| Cooling Water |  |  |
| $m^3$ @ DM 0.05 | 2,415 $m^3$h = | 435 $m^3/h$ = |
|  | DM 121 per hour | DM 22 per hour |
| Low-Pressure Steam 2.5 bar |  |  |
| tons/h @ DM 12 | 40 tons/h = | — |
|  | DM 480 per hour | — |
| $NH_3$ or DMF |  |  |
| kg/h $NH_3$ DM 0.30 per kg | 35 kg/h = |  |
|  | DM 10 per hour |  |
| DMF DM 3.00 per kg |  | 15 kg/h = |
|  |  | DM 45 per hour |
| Costs for Operating Medium |  |  |
| DM/h | 931 | 683 |
| Pfennigs per $Nm^3$ of $CO_2$ | 9.3 | 6.8 |

As can be derived from the comparison, considerable savings in costs can be achieved by employing the process of the present invention.

Typical blast furnace and stack gases treatable by this invention have the following approximate ranges of analyses:

| Vol % | blast furnace | stackgas |
|---|---|---|
| $N_2$ | 56 | 80 |
| CO | 20 | — |
| $O_2$ | — | 6 |
| $CO_2$ | 22 | 14 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

I claim:

1. In a process for separating $CO_2$ from a $CO_2$-containing gas, said process comprising scrubbing said gas in a scrubbing stage with dimethylformamide to absorb $CO_2$, regenerating resultant loaded dimethylformamide in a regeneration stage to remove $CO_2$, and compressing the $CO_2$ to medium and then to high pressure in a plurality of pressure stages, wherein the regeneration stage is conducted by pressure reduction and heating of the loaded dimethylformamide and recycling regenerated dimethylformamide into the scrubbing stage, the improvement which comprises heating the loaded dimethylformamide in heat exchange with a partial stream of the product $CO_2$ at a medium pressure, thereby liquefying the medium-pressure $CO_2$.

2. A process according to claim 1, wherein said scrubbing stage is conducted under a pressure of 1.5–3 bar and at a temperature of $-30°$ to $-60°$ C.

3. A process according to claim 2, wherein the regeneration of the scrubbing medium is conducted under a pressure of 0.05–0.3 bar and at a temperature of between $-60°$ C. and $-10°$ C.

4. A process according to claim 2, comprising recompressing the $CO_2$ liberated during regeneration in a plurality of compression stages, including a medium pressure level and a high pressure level.

5. A process according to claim 1, wherein the liquefied $CO_2$ is expanded and then vaporized in a cooling coil in heat exchange with the dimethylformamide in the scrubbing stage, so as to remove the heat of absorption of the $CO_2$ within the scrubbing stage.

6. A process according to claim 1, wherein the $CO_2$-containing gas also contains $SO_2$, and a partial stream of partially regenerated dimethylformamide is further regenerated in a separate stage to remove $SO_2$ by heating at a higher temperature than the $CO_2$-removal regeneration stage.

7. A process according to claim 1, further comprising pressure reducing, vaporizing, and withdrawing the liquefied $CO_2$.

8. A process according to claim 1, further comprising, prior to the scrubbing step, cooling the $CO_2$-containing gas reversible regenerators.

9. A process according to claim 1, wherein the $CO_2$-containing gas to be scrubbed contains at least about 8 percent by volume.

10. A process according to claim 9, wherein the $CO_2$-containing gas is a stack gas.

11. A process according to claim 9, wherein the $CO_2$-containing gas is a blast furnace gas.

12. In a process for separating $CO_2$ from a $CO_2$-containing gas, said process comprising scrubbing said gas in a scrubbing stage with dimethylformamide to absorb $CO_2$, regenerating resultant loaded dimethylformamide in a regeneration stage to remove $CO_2$, wherein the regeneration stage is conducted by pressure reduction and heating of the loaded dimethylformamide and recycling regenerated dimethylformamide into the scrubbing stage, the improvement which comprises heating the loaded dimethylformamide in heat exchange with a partial stream of the product $CO_2$ thereby liquefying the $CO_2$, and expanding the liquified $CO_2$ and then vaporizing it in a cooling coil in heat exchange with the dimethylformamide in the scrubbing stage, so as to remove the heat of absorption of the $CO_2$ within the scrubbing stage.

13. In a process for separating $CO_2$ from a $CO_2$ and $SO_2$-containing gas, said process comprising scrubbing said gas in a scrubbing stage with dimethylformamide to absorb $CO_2$, regenerating resultant loaded dimethylformamide in a regeneration stage to remove $CO_2$, wherein the regeneration stage is conducted by pressure reduction and heating of the loaded dimethylformamide and recycling regenerated dimethylformamide into the scrubbing stage, the improvement which comprises heating a partial stream of partially regenerated dimethylformamide to remove $SO_2$ in a separate stage at a higher temperature than the $CO_2$-regeneration stage and heating the remaining loaded dimethylformamide in heat exchange with a partial stream of the product $CO_2$ thereby liquefying the $CO_2$.

* * * * *